United States Patent [19]
Fujiwara et al.

[11] Patent Number: 5,347,451
[45] Date of Patent: Sep. 13, 1994

[54] ELECTRONIC CASH REGISTER HAVING AUXILIARY FILE CONTAINING INFORMATION WHICH IS TRANSFERRABLE TO AN ARTICLE FILE TO REDUCE OPERATOR ENTRIES

[75] Inventors: Yasuhiro Fujiwara, Mishima; Ryuuichi Fukuoka, Ichihara; Ryuuichirou Masui, Tokyo, all of Japan

[73] Assignee: Tokyo Electric Co., Ltd., Tokyo, Japan

[21] Appl. No.: 923,850

[22] Filed: Jul. 31, 1992

[30] Foreign Application Priority Data

Aug. 8, 1991 [JP] Japan .................................. 3-199296
Oct. 7, 1991 [JP] Japan .................................. 3-259460
Mar. 27, 1992 [JP] Japan .................................. 4-071407

[51] Int. Cl.$^5$ .............................................. G06F 15/21
[52] U.S. Cl. .................................................... 364/405
[58] Field of Search ............... 235/462, 383; 364/404, 364/405, 406

[56] References Cited

U.S. PATENT DOCUMENTS

| | | | |
|---|---|---|---|
| 4,757,448 | 7/1988 | Takagi | 364/404 |
| 4,870,577 | 9/1989 | Karasawa et al. | 364/405 |
| 4,875,163 | 10/1989 | Ishii | 364/405 |
| 4,879,649 | 11/1989 | Ishii | 364/405 |
| 5,060,185 | 10/1991 | Naito et al. | 364/405 |
| 5,162,639 | 11/1992 | Sugiyama | 235/383 |

*Primary Examiner*—Robert A. Weinhardt
*Attorney, Agent, or Firm*—Frishauf, Holtz, Goodman & Woodward

[57] ABSTRACT

An electronic cash register includes a RAM for storing an article file in which article data for various articles are filed. The article data includes an article code, an article name, a department, and a unit price. The RAM also includes an auxiliary file in which article data items of other articles re stored, which article data items include an article code and an article name. An input section is provided for inputting data of an article code, a department, and a unit price, and a processing unit is provided for reading out article data of an article corresponding to the article code input via the input section from the article file and processing the readout article data. The processing unit reads out article data filed in the auxiliary file, nd sets the readout article data in the article file along with data input via the input section.

13 Claims, 12 Drawing Sheets

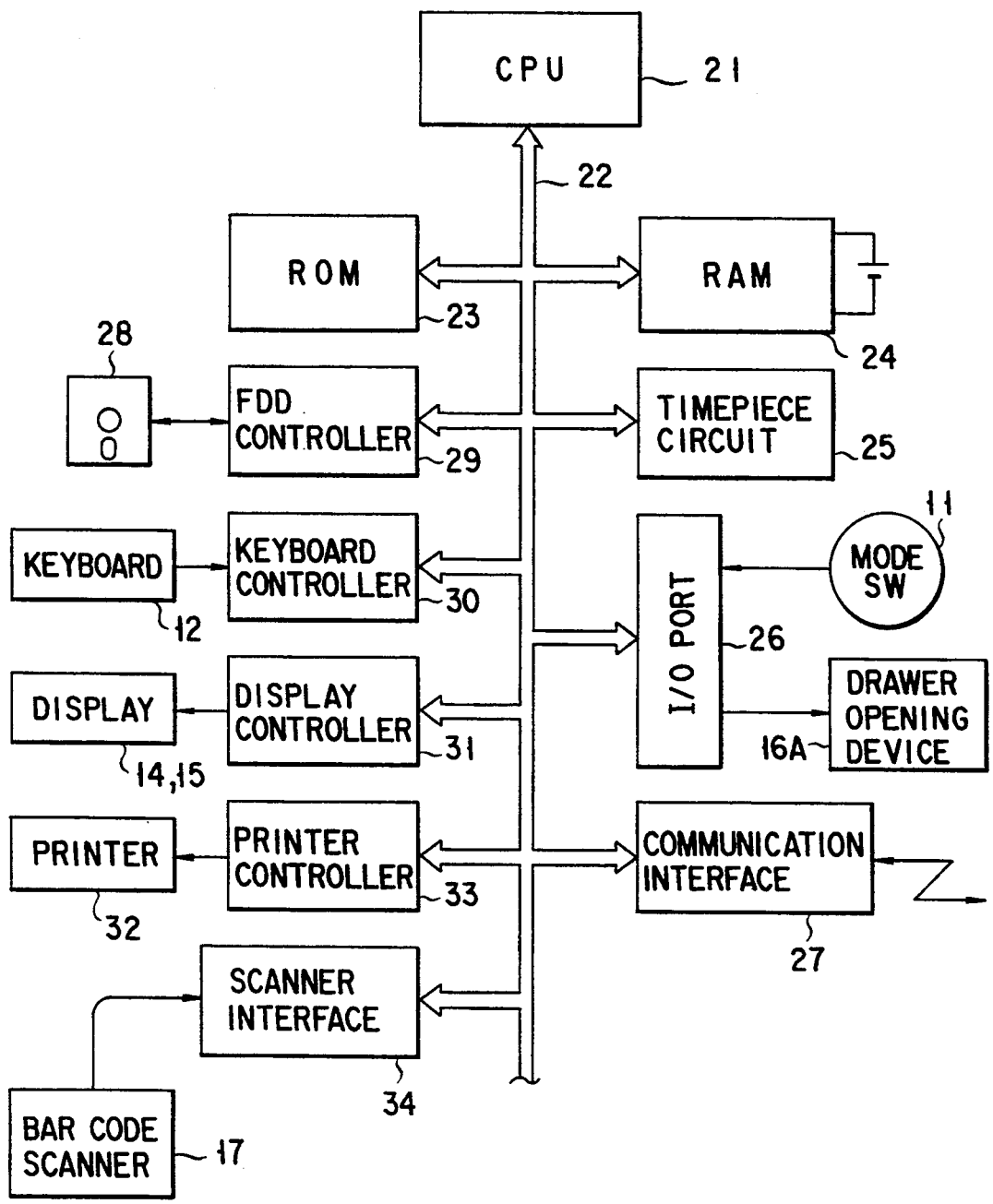
F I G. 3

FIG. 4

| ARTICLE CODE | ARTICLE NAME | DEPARTMENT | UNIT PRICE | NUMBER OF SOLD ARTICLES | SALES AMOUNT |
|---|---|---|---|---|---|
| 00001234 | ORANGE JUICE | | 00001240 | GRAPE JUICE | |
| 00011130 | APPLE JUICE | | 00012200 | CHOCOLATE | |

ARTICLE CODE   ARTICLE NAME   ARTICLE CODE   ARTICLE NAME

R1, R2, R3

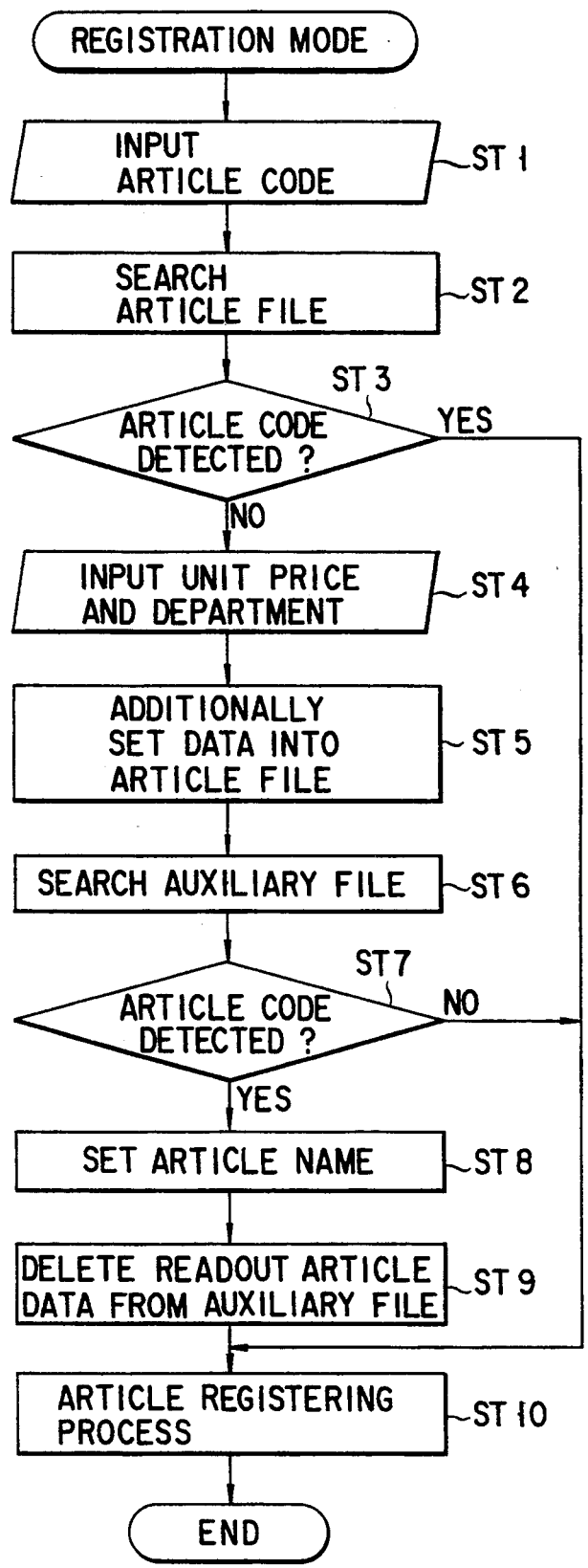
F I G. 5

FIG. 8

| ARTICLE CODE | ARTICLE NAME | DEPARTMENT | UNIT PRICE | TAX DIVISION | PACKED NUMBER | NUMBER OF SOLD ARTICLES | SALES AMOUNT |
|---|---|---|---|---|---|---|---|
| 00001234 | ORANGE JUICE | 01 | 200 | 0 | 0 | 0 | 0 |
| 00011130 | APPLE JUICE | 01 | 250 | 0 | 0 | 0 | 0 |
| 00012200 | CHOCOLATE | 02 | 100 | 0 | 0 | 0 | 0 |
| ----- | ----- | ----- | ----- | ----- | ----- | ----- | ----- |

|  | A1 | | | | A2 | |
|---|---|---|---|---|---|---|
| | ARTICLE CODE | ARTICLE NAME | DEPART-MENT | UNIT PRICE | NUMBER OF SOLD ARTICLES | SALES AMOUNT |
| 41 | | | | | | |

| ARTICLE CODE | ARTICLE NAME | DEPART-MENT | UNIT PRICE |
|---|---|---|---|
| | | | |

42

| DEPART-MENT | NUMBER OF SOLD ARTICLES | SALES AMOUNT |
|---|---|---|
| 01 | | |
| 02 | | |
| 03 | | |
| ⋮ | ⋮ | ⋮ |
| 14 | | |
| 15 | | |

| ARTICLE CODE | ARTICLE NAME | DEPART-MENT |
|---|---|---|
| 00001234 | | 03 |
| 00002140 | | 03 |
| 00011111 | | 01 |
| 00011221 | | 01 |
| | | |
| | | |
| ⋮ | ⋮ | ⋮ |
| | | |
| | | |
| | | |

51

F I G. 11

ELECTRONIC CASH REGISTER HAVING
AUXILIARY FILE CONTAINING INFORMATION
WHICH IS TRANSFERRABLE TO AN ARTICLE
FILE TO REDUCE OPERATOR ENTRIES

BACKGROUND OF THE INVENTION

1. Field of the Invention

This invention relates to an electronic cash register for reading article data of a sold article from an article file in which article data items of various articles are filed, and for processing the readout article data.

2. Description of the Related Art

A typical electronic cash register includes a memory for storing an article file for filing article data of various articles, each article, data including items such as an article code, article name and unit price; and sales data of the articles, each sales data including items such as the number of sold articles and sales amount.

In the process of registering articles for sale, a keyboard or bar code scanner is used for inputting an article code recorded on the article in the bar code format such as JAN, EAN or UPC. The electronic cash register registers the input article code as a sold article, reads out article data of the article identified by the article code from the article file, and updates the sales data of this article filed in the article file according to the readout article data. When a new article is sold before the article code thereof is set into the article file, addition of article data is required in the registration process. When the article data of the new article is input into the electronic cash register according to the requirement, the article data is set into the article file and is used for updating the sales data.

Since the number of types of characters constructing an article name is larger than that of numerals, it is difficult to correctly input the article name in a brief period of time. In most of the general electronic cash registers, keys for inputting characters are not provided and therefore a character code of at least two digits must be input for each of the characters of the article name by use of the numeral keys. For this reason, article data except the article name thereof is input in the registration process as a temporary measure, and in general, the article names of the new articles are collectively input after the closing time.

However, if the article name is not input in the registration process, it cannot be displayed or printed for a customer's convenience. Therefore, when the electronic cash register is first installed in the store, an article file in which article data items of not only the articles actively being sold, but also the maximum permissible number of articles are filed is prepared so as to reduce the number of article data items which must be newly set in the process of registering articles for sale. In order to easily prepare such am article file, for example, it is considered to read out an article file used in another store of the same trade by use of maintenance tool and load the readout article file into a desired electronic cash register. However, even if the article file is loaded in this way, the contents of the article file must be correctly changed because indispensable items of article data or prices of articles are different. It takes a long time and much labor to make such changes.

SUMMARY OF THE INVENTION

An object of this invention is to provide an electronic cash register which can be easily installed without increasing the manufacturing cost.

According to the present invention, an electronic cash register comprises memory means for storing an article file in which a plurality of first article data for various articles are filed; and circuit means for performing sales registration on the basis of the article file stored in said memory means. The memory means has an auxiliary file stored therein and means for filing a plurality of second article data, each of said second article data containing an article code and an article name. The circuit means includes input means for inputting at least an article code and information related to one of said various articles; and processing means for reading out that one of said plurality of second article data from the auxiliary file which is identified by an article code input from said input means, for producing first article data by appending predetermined items of information input from said input means to the article cod and the article name contained in the read second article data, and for setting the produced first article data in said article file.

In the above electronic cash register, the processing unit includes the setting section for reading out article data filed in the auxiliary file, and setting the readout article data in the article file along with data input via the input section. Since the article data read out from the auxiliary file includes an article name which takes a long time to input, the time and labor required for setting up the article file can be reduced in the installing operation of the electronic cash register in the store and the registering operation of articles for sale.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a diagram showing a control circuit of the electronic cash register of FIG. 1;

FIG. 4 is a diagram showing file storage areas of a RAM shown in FIG. 1;

FIG. 5 is a flowchart illustrating the registering operation of the electronic cash register shown in FIG. 1;

FIG. 8 is a diagram showing file storage areas of a RAM provided in an electronic cash register according to a second embodiment of this invention and similar to the electronic cash register of the first embodiment;

FIG. 10 is a diagram showing storage areas of a RAM provided in an electronic cash register according to a third embodiment of this invention and similar to the electronic cash register of the first embodiment;

FIG. 11 is a diagram showing an article file provided in a floppy disk used in the electronic cash register of the third embodiment;

DETAILED DESCRIPTION OF THE PREFERRED EMBODIMENTS

There will now be described an electronic cash register according to a first embodiment of this invention with reference to FIGS. 1 to 7C.

Figures 1, 2:
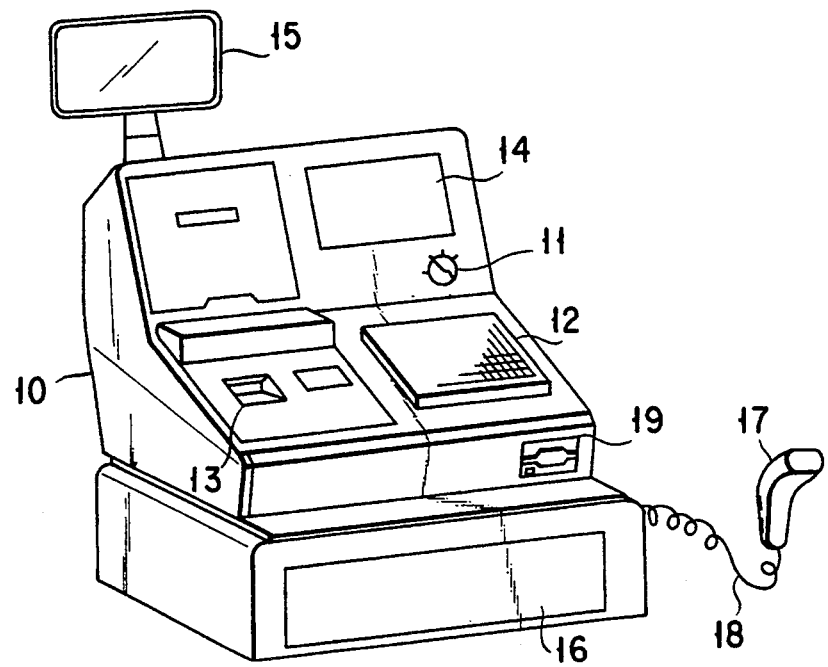
FIG. 1 is a view showing an external appearance of an electronic cash register according to one embodiment of this invention.
FIG. 2 is a view showing the construction of a keyboard shown in FIG. 1.
Figure 6:
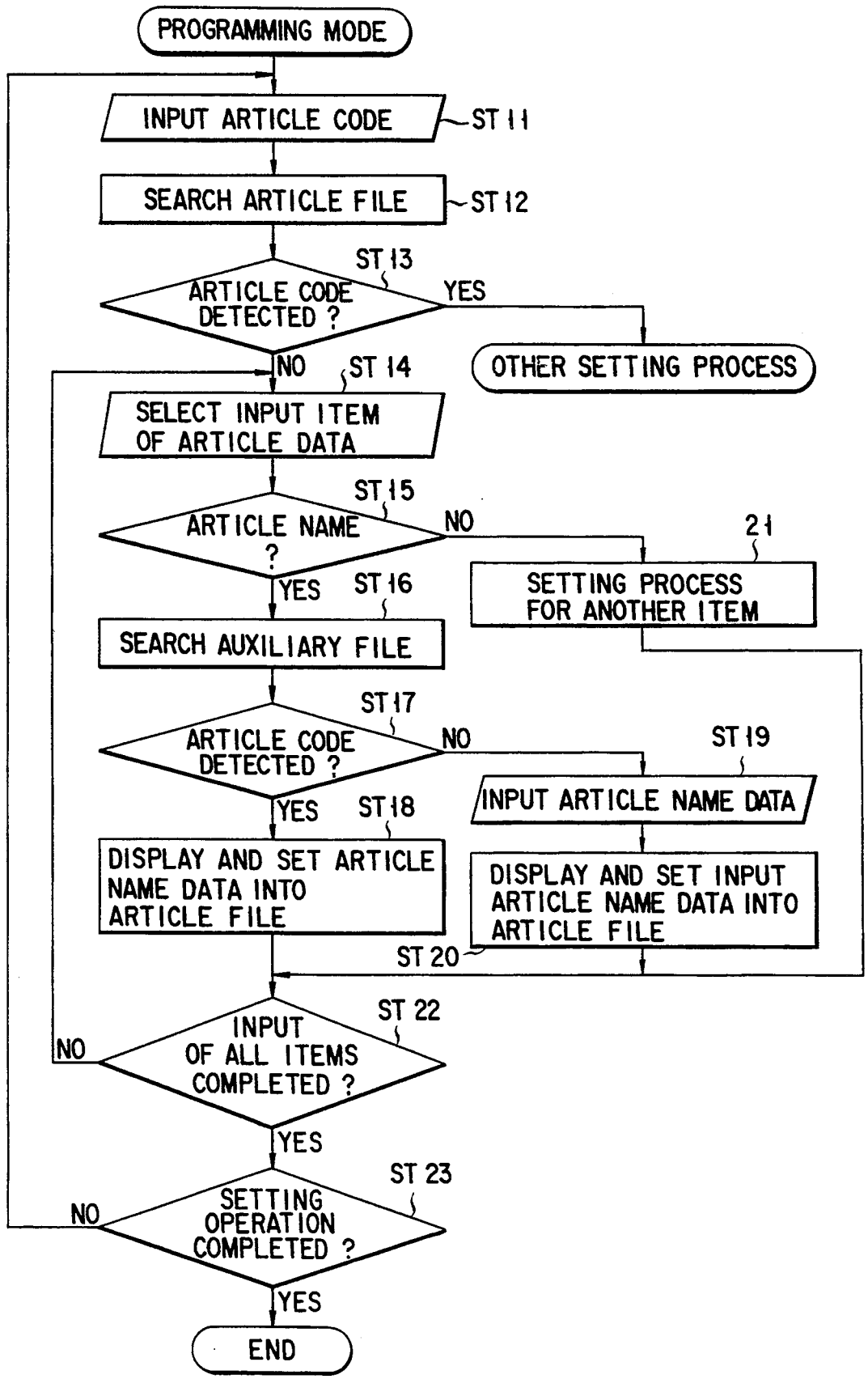
FIG. 6 is a flowchart illustrating the setting operation of the electronic cash register shown in FIG. 1.

FIG. 1 shows an external appearance of the electronic cash register. As shown in FIG. 1, the electronic cash register includes a mode switch 11, keyboard 12, receipt discharging port 13, cashier display unit 14, customer display unit 15, drawer 16, handy scanner 17, and floppy disk insertion port 19. The handy scanner 17 is connected to a signal cable 18 extending from the side surface of a main body 10 and reads an article code of bar code format from an article which is set to face or in contact with the scanner by the operation of the operator. The receipt discharging port 13 is used to permit issuance of receipt on which the specification of transaction is printed for each customer. The drawer 16 is disposed on the bottom portion of the main body 10 to receive cash or cash-equivalent note paid by the customer. The floppy disk insertion port 19 is used to permit insertion or removal of a floppy disk to be accessed as an external storage medium. The mode switch 11 is a switch rotated by a key inserted therein and selects one of the operation modes of "checking", "settlement", "registration" and "programming". As shown in FIG. 2, the keyboard 12 includes a plurality of numeral keys K1 for inputting "00" and "0" to "9", a plurality of department keys K2 for selecting departments of articles, and various function keys such as a sub-total key K3, total key K4, "x" key K5, "#" key K6, and clear key K7. The customer display unit 15 is constructed in the same manner as the cashier display unit 14 except that the customer display unit 15 is rotatably mounted on the main body 10 so that the direction of the display plane can be freely set. The display units 14 and 15 may be constructed by a CRT display device, liquid crystal display device or dot display tube, for example, and used to display the article name and unit price of each sold article, and total sales amount, change, and the like.

FIG. 3 shows the control circuit of the electronic cash register. The electronic cash register includes a CPU 21, ROM 23, RAM 24, timepiece circuit 25, input/output port 26, communication interface 27, floppy disk drive (FDD) controller 29, keyboard controller 30, display controller 31, printer controller 33 and scanner interface 34 which are connected to one another via a bus line 22 and provided in the main body 10 as the control circuit. The CPU 21 effects the data processing and controlling operations necessary for the whole operation of the electronic cash register. The ROM 23 is used to store the control program for the CPU 21 and fixed data such as character fonts, and the RAM 24 is used to temporarily store input/output data of the CPU 21. The RAM 24 is also used to store a plurality of files which are to be updated and is connected to a back-up battery for holding the files when the power source is turned off. The electronic cash register further includes a floppy disk drive 28, printer 32 and drawer opening unit 16A disposed in the main body 10. The FDD controller 29 is connected to the floppy disk drive 28, the printer controller 33 is connected to the printer 32, the input/output port 26 is connected to the drawer opening unit 16A and mode switch 11, the keyboard controller 30 is connected to the keyboard 12, the display controller 31 is connected to the display units 14 and 15, and the scanner interface 34 is connected to the handy scanner 17. The timepiece circuit 25 counts the date and time. The drawer opening unit 16A drives and opens the drawer 16 in response to an opening signal supplied via the input/output port 26. The communication interface 27 controls data communication between the electronic cash register and an external host unit which is connected to the electronic cash register via a communication line when the electronic cash register is used as a POS terminal, for example. The FDD controller 29 controls the floppy disk drive 28 to access a floppy disk loaded on the floppy disk drive 28. The keyboard controller 30 converts a key signal corresponding to the operation of the keyboard 12 into an electrical input signal. The display controller 31 controls the display operation of the display units 14 and 15. The printer controller 33 control the printing operation of the printer 32. The scanner interface 34 receives an article code which is read by the handy scanner 17 and converted into an electrical signal as an input code.

The RAM 24 has file storage areas as shown in FIG. 4. In FIG. 4, R1 indicates the whole portion of the file storage areas, R2 indicates an area for storing an article file in which article data items of dealing articles (i.e., articles which are to be sold or which may be sold by a store) each constructed by predetermined items such as an article code, article name, department, and unit price and sales data of the dealing articles each constructed by predetermined items such as the number of sold articles and sales amount are filed, and R3 indicates an area for storing an auxiliary file in which article data items of non-dealing articles (i.e., articles which are not to be sold) constructed by part of the predetermined items including an article code and an article name are filed. The article data in the auxiliary file is used when the article data of a new article is additionally set into the article file, and after the article data is additionally set in the article file, it is deleted from the auxiliary file.

Now, the registering operation of the electronic cash register is explained. The CPU 21 is programmed to operate according to the flowchart shown in FIG. 5 when the "registration" mode is selected by the mode switch 11.

After starting the operation, the CPU 21 inputs an article code read by the scanner 17 in the step ST1 and searches the article file based on the input article code in the step ST2. When it is detected in the step ST3 that an article code corresponding to the input article code is present in the article file, the registration process for an article for sale is effected in the step ST10. In the registration process, the input article code is registered as a sold article, the article data of the sold article is read out from the article file, and sales data in the article file is updated according to the readout article data. That is, when the numeral key K1 is operated to input numeral data immediately before the input of the article code, the input numeral data is used as the number of articles to be sold. Therefore, this number is added to the number of sold articles identified by the input article code. On the other hand, when no numeral data is input by means of the numeral key K1, then "1" is used as the number of articles to be sold. Therefore, "1" is added to the number of sold articles identified by the input article code. Further, the sales amount of the sold articles is increased by an amount obtained by multiplying the unit price thereof by the number of articles to be sold. At this time, the display units 14 and 15 and the printer 32 are driven to display or print information relevant to the article identified by the input article code (for example, an article name, department, and sales amount). A printed output serves as part of a receipt.

If it is detected in the step ST3 that an article code corresponding to the input article code is not present in the article file, the CPU 21 requests key input for the unit price and attribute department among the items of article data of a new article in the step ST4 and additionally sets unit price data and department data which are input by use of the numeral key K1 and department key K2 in the last portion of the article file together with the article code in such a form as shown in FIG. 4 in the step ST5. In the succeeding step ST6, the auxiliary file is searched based on the article code input in the step ST1. If it is detected in the step ST7 that an article code corresponding to the input article code is present in the auxiliary file, the CPU 21 reads out article name data corresponding to the article code and filed in the auxiliary file, sets the readout article name data as the remaining item of the article data of the new article into the article file in the form shown in FIG. 4, and deletes the article name data read out in the step ST8 together with the corresponding article code from the auxiliary file. After this, the CPU 21 effects the step ST10.

If it is detected in the step ST7 that an article code corresponding to the input article code is not set in the auxiliary file, the CPU 21 effects the step ST10 without setting the article name. In this case, the operation of displaying and printing the article name is omitted in the step ST10.

The operation in the registration mode described above is repeated for all of the articles which one customer wishes to purchase, and after the entire registering operation is completed, a receipt having the total sales amount further printed thereon is issued.

Next, the programming operation of the electronic cash register is explained. The CPU 21 is programmed to effect the operation according to the flowchart shown in FIG. 6 when the "programming" mode is selected by the mode switch 11. After starting the operation, the CPU 21 searches the article file based on an input article code in the step ST11. When it is detected in the step ST13 that an article code corresponding to the input article code is not present in the article file, the process of setting article data is effected. That is, the CPU 21 requests key input for selecting one of the article name, unit price and department to be set as an item of the article data of the new article in the step ST14. If it is detected in the step ST15 that the to-be-set item is the article name, the auxiliary file is searched in the step ST16 according to the article code input in the step ST11. If it is detected in the step ST17 that an article code corresponding to the input article code is present in the auxiliary file, the CPU 21 reads out article name data filed in the auxiliary file in the step ST18, sets the article name data together with the article code in the last portion of the article file in the form shown in FIG. 4, and deletes the readout article name data together with the article code from the auxiliary file. At this time, the display units 14 and 15 display the readout article name data. After this, the CPU 21 effects the step ST22.

If it is detected in the step ST17 that an article code corresponding to the input article code is not present in the auxiliary file, the CPU 21 requests input for article name data from the keyboard 12 in the step ST19 and sets the article name data input by key operation in the last portion of the article file together with the article code in the form shown in FIG. 4 in the step ST20. After this, the CPU 21 effects the step ST22.

When a setting item other than the article name is selected in the step ST14, the CPU 21 inputs data of the item in the same manner as in the prior art in the step ST21 and sets the same in the last portion of the article file together with the article code in the form shown in FIG. 4. After this, the CPU 21 effects the step ST22.

In the step ST22, whether the operation of inputting all of the items of the article data of one article is completed or not is checked. If the input operation is not yet completed, then the step ST14 is effected again. If the input operation is completed, whether the total key K4 for terminating the article data setting operation for all of the articles is depressed or not is checked in the step ST23. If another key is depressed, the step ST11 is effected again. On the other hand, if the total key K4 is depressed, the article data setting operation is completed.

Figure 7A:
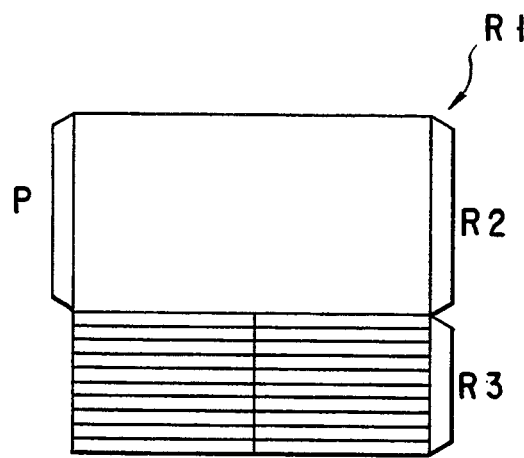
FIGS. 7A to 7C are diagrams for illustrating variation in sizes of files stored in the RAM of FIG. 1.

When the above electronic cash register is installed in the store, the file storage area R1 of the RAM 24 is constructed as shown in FIG. 7A. That is, the auxiliary file is provided in the area R3 which is part of the area R1 and the remaining portion of the area R1 except the area R3 is allotted for the storage area R2 for the article file. At this time, the entire portion of the storage area R2 is set as an empty area P. The auxiliary file is loaded into the storage area R3 by use of an exclusive-use maintenance tool. The auxiliary file contains article name data of a large number of non-dealing articles (i.e., articles which are not to be sold) which are previously classified and filed for different types of industry and different regions.

For example, if the operation in the registration mode is effected in this condition, article name data items of new articles are sequentially read out from the auxiliary file and the readout article name data is set into the article file together with an article code, unit price data and department data input from the scanner 17 or keyboard 12. At this time, sales data is further set into the article file with an initial value "0" and the sales data is updated based on the corresponding article data. That is, each time a new article is sold and registered, the article data and sales data of the article are additionally set into the article file.

In a case where the article file is thus set up by use of the article name previously filed in the auxiliary file, the necessity of the key-in operation of character codes by use of the numeral keys can be significantly reduced. Further, since the registration operation can be effected even when the article file is empty, the set-up operation of the article file effected when the electronic cash register is installed in the store can be simplified and the time and labor for the set-up operation can be greatly reduced. Further, the auxiliary file can be used not only for the operation in the registration mode but also for the operation in the programming mode.

Since the article name of the new article set in the article file in the registration mode can be displayed or printed, the customer can check a registration error according to the displayed or printed contents. If the article name is filed in the auxiliary file, the article name will be printed on the issued receipt without fail.

Figure 7B:
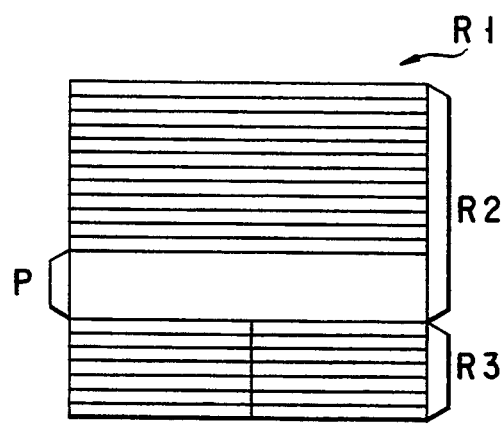
Figure 7C:
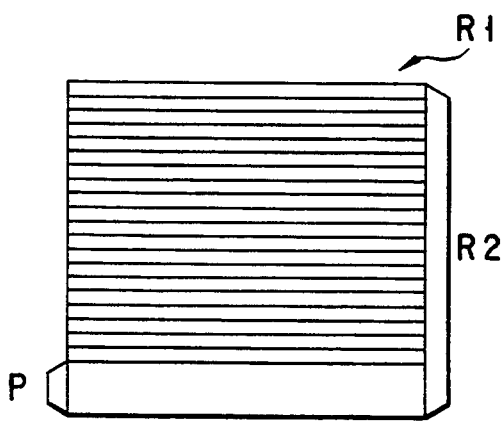

In the registration mode and programming mode, unnecessary article name data and article code which are left behind in the auxiliary file are cleared when the article name data is read out from the auxiliary file to set the article data of the new article into the article file. That is, the auxiliary file is reduced while the article file is expanded by use of the article name data read out from the auxiliary file. Therefore, even if the auxiliary file is set to have the size shown in FIG. 7A, the size thereof is changed as shown in FIG. 7B after the article name data of new articles is set. Further, when the article name data of all of the non-dealing articles in the auxiliary file is set into the article file, the size of the auxiliary file becomes zero. After this, the article file can be further expanded if the empty area P is left in the area R1 and all portion of the area R1 can be used. Thus, even if the above auxiliary file is set in the file storage area, it is not necessary to increase the memory capacity of this area, thereby making it possible to keep the cost of the memory in comparison with that of the prior art.

In the above embodiment, the article name is filed together with a corresponding article code in the auxiliary file, but this invention is not limited to this case and can be variously modified.

For example, articles such as foodstuffs and daily use goods are classified according to the property and application thereof and corresponding department codes are allotted to them. Recently, the classification is standardized by the JAN item code file service (JICFS) and a large number of stores utilize this classification. Further, each store is required to separately deal with taxable articles and tax-free articles at the time of collection of consumption taxes of preset tax rate and is also required to separately deal with tax-inclusive articles whose list prices include consumption tax amounts and tax-exclusive articles whose list prices do not include consumption tax amounts. With the above tax division, it becomes common practice to use tax division flags in the article file. Therefore, it is considered to additionally provide data items such as department code or tax division flags which are different from the article names as the article data items of non-dealing articles in the auxiliary file.

Figure 9:
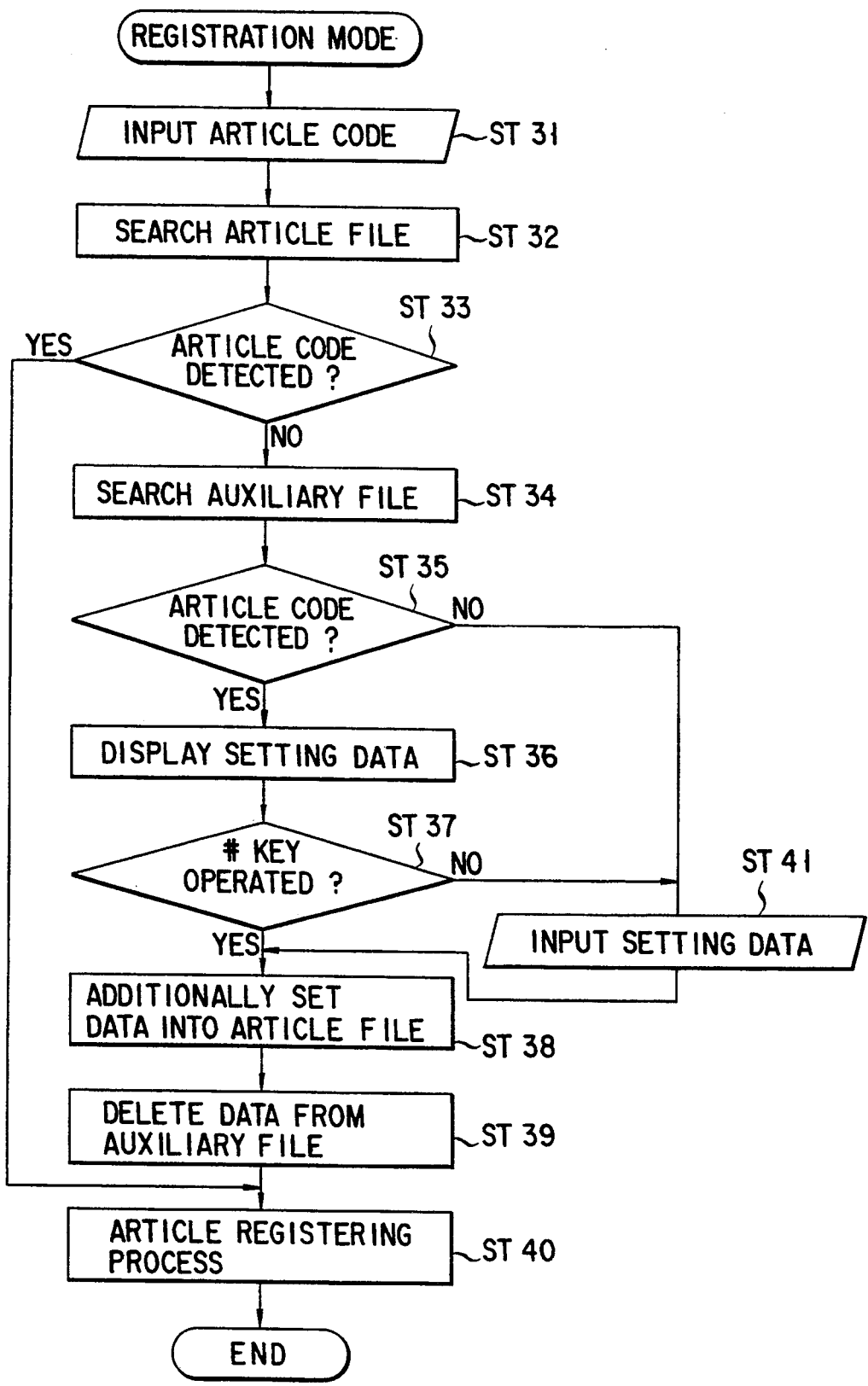
FIG. 9 is a flowchart illustrating the registering operation of the electronic cash register of the second embodiment.

Next, an electronic cash register according to the second embodiment of this invention which can be used in 10 the above condition is explained with reference to FIGS. 8 and 9. The electronic cash register is formed with the construction similar to that of the first embodiment shown in FIGS. 1 to 3. Therefore, like portions are denoted by the same reference numerals and the explanation therefor is omitted. The electronic cash register is different from that of the first embodiment in the construction of the file storage area of the RAM 24.

In the above electronic cash register, the RAM 24 has a file storage area R1 as shown in FIG. 8. The area R1 is divided into two half areas, that is, a storage area R2 for the article file and a storage area R3 for the auxiliary file, at the time of installation of the electronic cash register. The article file files article data items of dealing articles each constructed by items of an article code, article name, department, unit price, tax division, and packed number and sales data of the dealing articles each constructed by items of the number of sold articles and sales amount. The auxiliary file files article data items of non-dealing articles each constructed by items of an article code, article name, department and tax division. In the auxiliary file, the department data represents a department code of an article classified in terms of the standard classification form of JICFS, the unit price data represents a value of reference unit price, the tax division data represents reference tax division flags (0: tax-exclusive article, 1: tax-inclusive article, 2: tax-free article), and the packed number data represents a reference number of articles which are packed to be sold in units of one pack.

Next, the operation in the registering mode of the electronic cash register is explained. The CPU 21 is programmed to operated according to the flowchart shown in FIG. 9 when the "registration" mode is set by means of the mode switch 11.

After the registering operation is started, the CPU 21 inputs an article code read by the scanner 17 in the step ST31 and searches the article file based on the input article code in the step ST32. If it is detected in the step ST33 that an article code corresponding to the input article code is present in the article file, the process of registering an article for sale is effected in the step ST40. In the registering process, the input article code is registered as a sold article, article data of the sold article, that is, data of article name, department, unit price, tax division and packed number is read out from the article file, and sales data in the article file is updated based on the article data in the same manner as in the first embodiment. In this case, the number of articles packed to be sold in units of one pack is added to the number of sold articles identified by the input article code. The display units 14 and 15 and printer 32 are driven in the same manner as in the first embodiment.

If it is detected in the step ST33 that an article code corresponding to the input article code is not present in the article file, the auxiliary file is searched based on the input article code in the step ST34. If it is detected in the step ST35 that an article code corresponding to the input article code is set in the auxiliary file, the CPU 21 reads out the article code together with data items of article name, department, unit price, tax division, and packed number filed in the auxiliary file and displays them on the cashier display unit 14. In the next step ST37, whether the "#" key K6 of the keyboard 12 is depressed or not is checked. When the key operation of the key K6 is detected, the CPU 21 additionally sets the data items of article name, department, unit price, tax division, and packed number read out from the auxiliary file into the article file together with the input article code in the form shown in FIG. 8 in the step ST38 and deletes the data items and a corresponding code from the auxiliary file in the step ST39. After this, the CPU 21 effects the registration process of an article for sale in the step ST40 as described before.

If it is detected in the step ST35 that an article code corresponding to the input article code is not present in the auxiliary file, the CPU 21 displays the request for data input of necessary items of unit price and tax division on the cashier display unit 14, receives data of the necessary items input by key operation in the step ST41, and additionally sets the input data together with input article code into the article file in the form shown in FIG. 8 in the step ST38. After this, the CPU 21 effects the registration process of an article for sale in the step ST40 as described before. At this time, the operation of displaying and printing the article name is not effected.

Further, when it is detected in the step ST37 that the "#" key K6 is not operated, the CPU 21 receives change data of items of unit price and tax division input by key operation in the step ST41 and additionally sets the change data together with the input article code into the article file in the form shown in FIG. 8 in the step ST38. As items which are not input by the key operation, data items read out from the auxiliary file are set into the article file. After this, the CPU 21 deletes the data items of article name, department, unit price, tax division, and packed number of articles which are used to be set into the article file together with the corresponding article code from the auxiliary file and then effects the registration process of an article for sale in the step ST40 as described before.

When the electronic cash register of the second embodiment is installed in the store, the storage area R2 of the article file provided in the RAM 24 is made empty. The auxiliary file is loaded into the storage area R3 by use of an exclusive-use maintenance tool. The auxiliary file contains standard article data items of a large number of non-dealing articles, that is, article codes, article names, departments, unit prices, tax divisions and packed numbers which are previously classified and filed for different types of industry and different regions.

For example, if the operation in the registration mode is effected in this condition, data items of article name, unit price, tax division, and packed number are read out from the auxiliary file as article data of a sold article and the readout data items are displayed on the display unit 14. When the cashier depresses the "#" key K6 after confirming the display contents, the readout data items are set into the article file. If the readout data items contain an item or items to be changed, the "#" key K6 is not depressed. Instead, change data of the item is input by key operation and the change data is set into the article file along with the other data items.

With the above electronic cash register, data items of unit price, tax division and packed number in addition to an article name can be read out from the auxiliary file in the registration mode and set into the article file and part of the items to be set into the article file can be selectively changed by key operation. Therefore, the time and labor required for setting up the article file at the time of installation can be further reduced.

Figure 13:
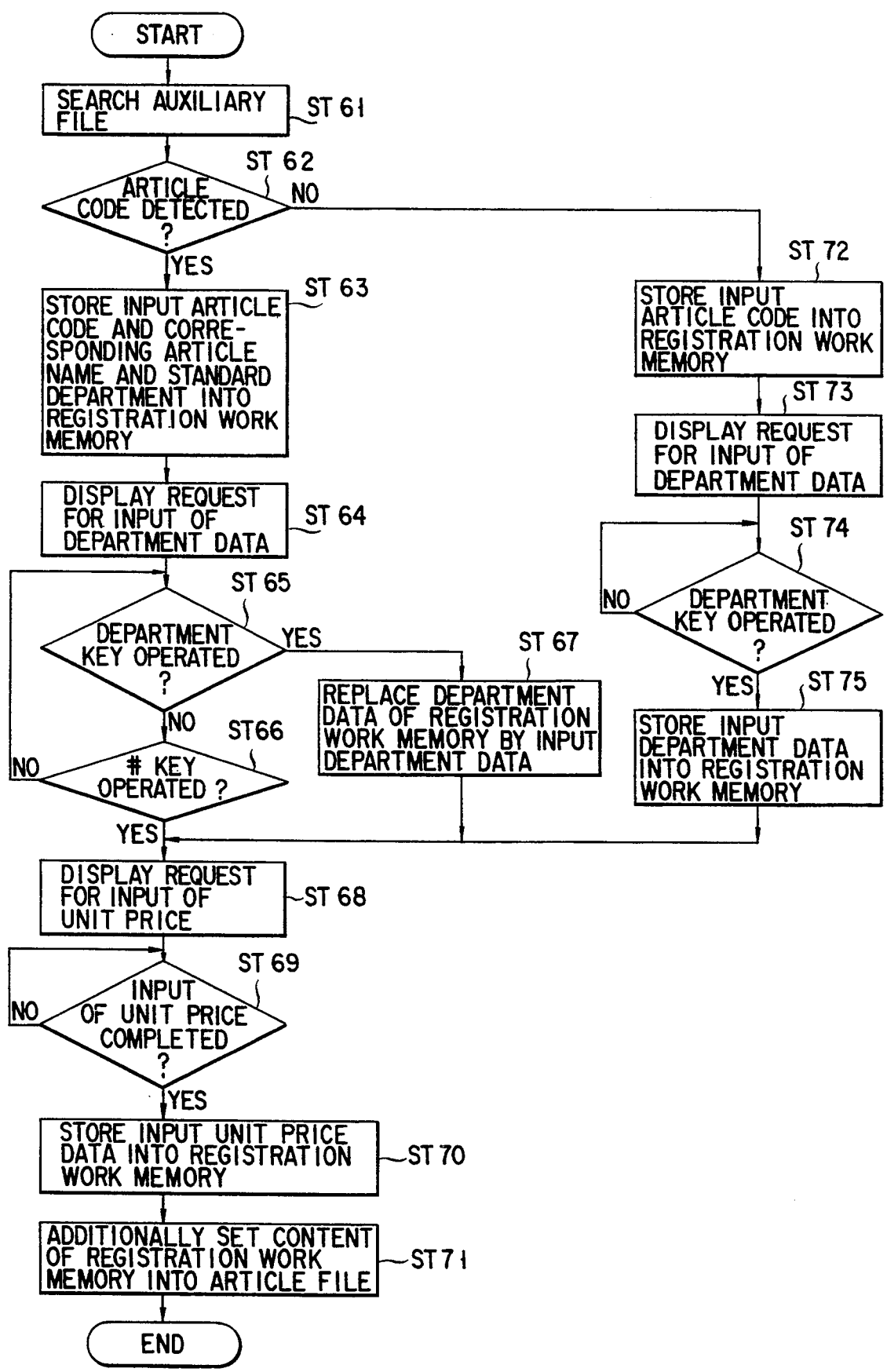
FIG. 13 is a flowchart illustrating the additional process shown in FIG. 12 more in detail.

Next, an electronic cash register according to the third embodiment of this invention is explained with reference to FIGS. 10 and 13. The electronic cash register is formed with the construction similar to that of the first embodiment shown in FIGS. 1 to 3. Therefore, like portions are denoted by the same reference numerals and the explanation therefor is omitted. The electronic cash register is different from that of the first embodiment in that a floppy disk having an auxiliary file stored therein is accessed.

In the above electronic cash register, an article data file 41, registration work memory 42 and department-specified totalizer 43 are provided in the RAM 24 as shown in FIG. 10. The article data file files article data items of dealing articles each constructed by items of article code, article name, department and unit price and sales data items of the dealing articles each constructed by the number of sold articles and sales amount. In FIG. 10, A1 denotes a storage area for article data of the dealing articles and A2 denotes a storage area for sales data of the dealing articles. The registration work memory 42 temporarily stores article data of a sold article, that is, data of article code, article name, department and unit price. The department-specified totalizer 43 files the number of sold articles and sales amount for each department together with a corresponding department code.

A floppy disk having an auxiliary file 51 stored therein is laded on a floppy disk driver 28. As shown in FIG. 11, article data items of non-dealing articles each constructed by items of article code, article name and department are previously filed in the auxiliary file 51. The department data represents a department code of an article classified according to the JICFS standard classification form.

Figure 12:
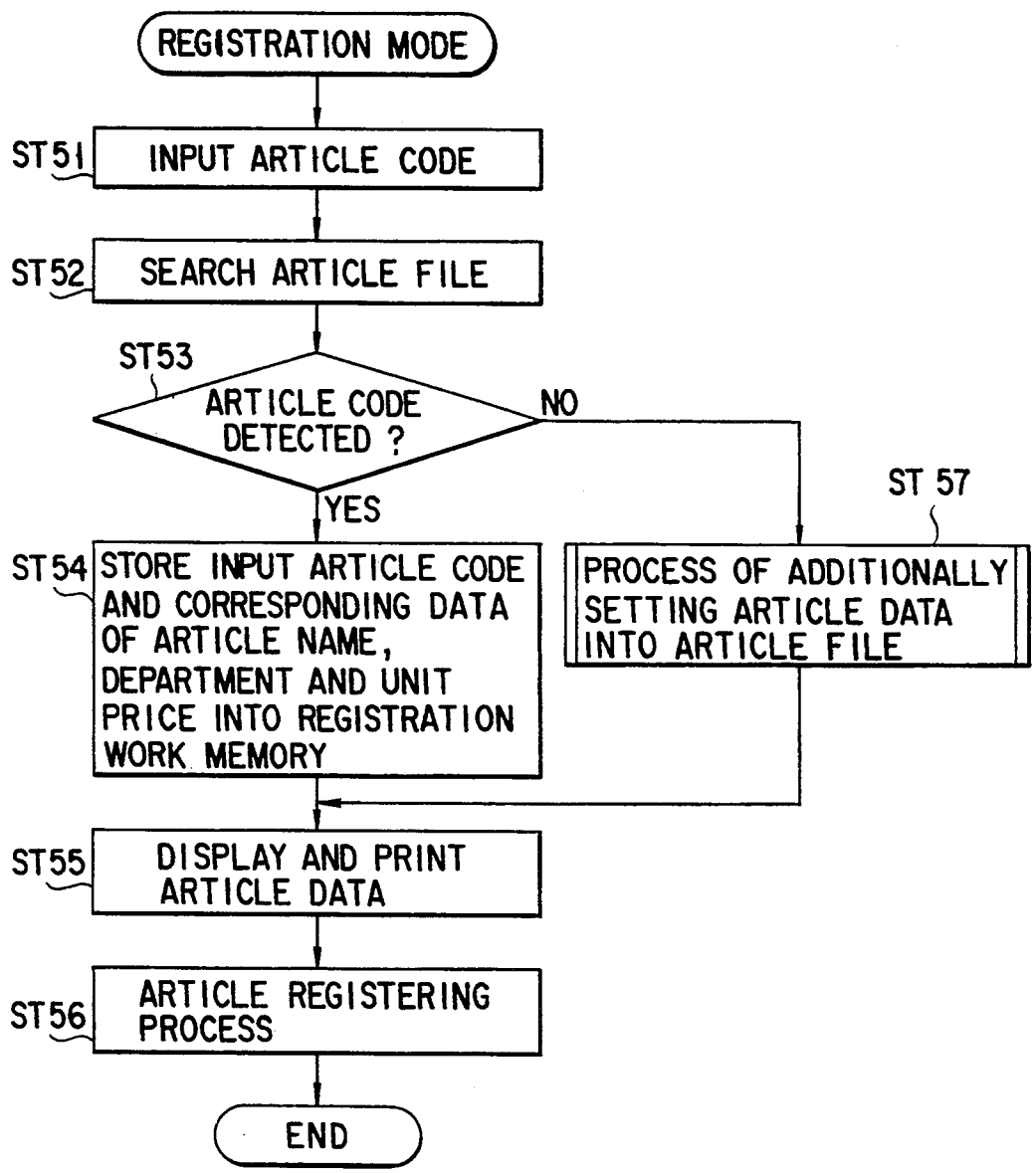
FIG. 12 is a flowchart illustrating the registering operation of the electronic cash register of the third embodiment.

Next, the registering operation of the above electronic cash register is explained. The CPU 21 is programmed to operate according to the flowchart shown in FIG. 12 when the "registration" mode is selected by means of the mode switch 11.

After the operation is started, the CPU 21 inputs an article code read from an article in the step ST51 and searches the article file based on the input article code in the step ST52. If it is detected in the step ST53 that an article code corresponding to the input article code is present in the article file 41, the CPU 21 reads out article data of the article corresponding to the input article code, that is, article code, article name data, department data and unit price data from the article file 41 and stores the readout data into the registration work memory 42 in the step ST54. After this, in the step ST55, the CPU 21 uses "1" as the number of sold articles and the unit price data stored in the registration work memory 42 as the sales amount, drives display units 14 and 15 to display the number of sold articles and the sales amount, and drives a printer 32 to print the article name, sales amount and the number of sold articles on a receipt, and then, effects the registration process of an article for sale in the step ST56.

In the registration process, the number of sold articles and the sales amount thereof are respectively added to the number of corresponding sold articles and sales amount thereof stored in the article file 41 and added to the number of sold articles of a corresponding department and sales amount thereof filed in the department-specified totalizer 43.

If it is detected in the step ST53 that an article code corresponding to the input article code is not present in the article file 41, the sold article is regarded as a new article. At this time, the CPU 21 effects the additional setting process of article data shown in FIG. 13 to additionally set article data of the sold article into the article file in the step ST57 and then effects the step ST55.

In the additional setting process of article data, the auxiliary file 51 stored in the floppy disk is searched according to the input article code in the step ST61. If it is detected in the step ST62 that an article code corresponding to the input article code is set in the auxiliary file 51, the CPU 21 reads out article data filed together with the article code in the auxiliary file 51, that is, article name data and department data, stores the article name data and department data together with the input article code into the registration work memory 42 in the form shown in FIG. 10 in the step ST63, and then drives the cashier display unit 14 to display the message "PLEASE INPUT DEPARTMENT CODE", for example, for requesting input of department data in the step ST64. After this, the steps ST65 and ST66 are repeatedly effected until either the department key K2 or "#" key is operated. If the operation of the department key K2 is detected in the step ST65, the CPU 21 uses a department code allotted to the department key K2 as input department data and changes the department data stored in the registration work memory 42 to the input department data. Then, the CPU 21 effects the step ST68. The step ST68 is also effected when the operation of the "#" key K6 is detected in the step ST66. The department data stored in the registration work memory 42 is confirmed by operation of the "#" key K6.

In the step ST68, the CPU 21 drives the display unit 14 to display the message "PLEASE INPUT UNIT PRICE", for example, for requesting input of unit price data. The unit price data is input by use of the numeral keys K1 and "x" key K5. The numeral keys K1 are operated to input numerals indicating the unit price and the "x" key K5 is operated to terminate the numeral inputting operation. When it is detected in the step ST69 that input of the unit price data is completed, the input unit price data is stored into the registration work memory 42 in the step ST70. Further, the CPU 21 additionally sets the contents of the registration work memory 42 into the last portion of the article file 41 in the step ST71 and completes the additionally setting process of article data.

If it is detected in the step ST62 that an article code corresponding to the input article code is not set in the auxiliary file 51, the CPU 21 stores the input article code into the registration work memory 42 in the step ST72 and then drives the cashier display unit 14 to display the message "PLEASE INPUT DEPARTMENT CODE", for example, for requesting input of department data in the step ST73. After this, the step ST74 is repeatedly effected until the department key K2 is operated. If the operation of the department key K2 is detected in the step ST74, the CPU 21 uses in the step ST75 a department code allotted to the department key K2 as input department data and stores the input department data into the registration work memory 42. Then, the CPU 21 effects the step ST68.

When the electronic cash register of the third embodiment is installed in the store, the storage area of the article file 41 provided in the RAM 24 is made empty. The floppy disk stores the auxiliary file 51 and is loaded into the floppy disk drive 28. The auxiliary file 51 contains article data items of a large number of non-dealing articles, that is, article codes, article name data items, and department data items. The department data represents a department code determined according to the classification form of JICFS.

If it is detected in the operation of registration mode that article data of a sold article is not present in the article file 41 and is present in the auxiliary file 51, article name data and department data stored as the article data of the article are read out from the auxiliary file 51 and set into the registration work memory 42 together with the input article code and unit price data input by key operation. In a store in which articles are classified according to the classification form of JICFS, the content of the registration work memory 42 is set into the article file 41 as the article data of the new article. On the other hand, in a store in which articles are not classified according to the classification form of JICFS, the department data set in the registration work memory 42 is first changed and then the content of the registration work memory 42 is set into the article file 41 as the article data of the new article.

In the electronic cash register of the third embodiment, the article data of the new article can be read out from the auxiliary file 51 and set into the article file 41 in the registration mode in the same manner as in the former embodiment and part of items to be stored into the article file can be changed by key operation. Therefore, the time and labor required for setting up the article file at the time of installation can be reduced like the former embodiment.

Further, since the article data of a new article is read out from the auxiliary file 51 stored in the floppy disk and set into the article file 41, it is not necessary to previously store the auxiliary file 51 into the RAM 24 by use of a maintenance tool. Since the auxiliary file 51 is not stored in the RAM 24, it becomes unnecessary to delete article data from the auxiliary file 51 after it is used so as to prevent the article data from uselessly occupying the memory area of the RAM 24. Further, the floppy disk can be removed from the floppy disk drive 28 and a floppy disk having a new auxiliary file stored therein can be easily used.

In the first to third embodiments, the RAM 24 or floppy disk is used to store the auxiliary file, but another storage medium such as a ROM, optical disk, fixed magnetic disk can be used instead of them. 10 Further, in the above embodiments, a department code is used to classify articles, but another classifying code (for example, class code or group code) other than the department code can be used.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic cash register comprising:
   memory means for storing an article file in which a plurality of first article data for various articles are filed; and
   circuit means for performing sales registration on the basis of the article file stored in said memory means;
   said memory means having an auxiliary file stored therein and means for filing a plurality of second article data, each of said second article data containing an article code and an article name; and
   said circuit means includes:
   input means for inputting at least an article code and information related to one of said articles; and
   processing means for reading out that one of said plurality of second article data from the auxiliary file which is identified by an article code input from said input means, for producing first article data by appending predetermined items of information input from said input means to the article code and the article name contained in the read second article data, and for setting the produced first article data in said article file.

2. The electronic cash register of claim 1, wherein:
said memory means includes a random access memory having a first area for storing said article file and a second area for storing said auxiliary file; and
said processing means includes means for deleting from said auxiliary file the second article data which has been read by said processing means and left in said auxiliary file to vary the ratio between the sizes of said first and second areas.

3. The electronic cash register of claim 1, wherein:
each second article data filed in said auxiliary file contains candidates for the predetermined items of information along with the article code and the article name; and
said processing means further includes means for displaying the candidates contained in the read article, and means for correcting unacceptable candidates according to predetermined items of information input only for the unacceptable candidates.

4. The electronic cash register of claim 3, wherein said processing means includes means for omitting said correction when an instruction for accepting the displayed candidates is input from said input means.

5. The electronic cash register of claim 1, wherein said memory means includes:
a random access memory for storing said article file; and
a memory medium other than the random access memory, for storing said auxiliary file.

6. The electronic cash register of claim 1, wherein said processing means includes:
means for searching said article file for first article data identified by an article code input from said input means; and
means for performing the sales registration on the identified first article data.

7. The electronic cash register of claim 6, wherein said processing means includes:
means for searching said auxiliary file for second article data identified by the input article code when the identified first article data is detected to be absent in said article file;
means for reading the identified second article data from the auxiliary file, for producing first article data by appending predetermined items of information input from said input means to the article code and the article name contained in the read second article data; and
means for setting the produced first article data in said article file.

8. The electronic cash register of claim 7, wherein said processing means includes:
means for producing first article data by combining an article code, an article name, and predetermined items of information input from said input means when the identified second article data is detected to be absent in said article file; and
means for setting the produced first article data in said article file.

9. The electronic cash register of claim 7, wherein:
said memory means includes a random access memory having a first area for storing said article file and a second area for storing said auxiliary file; and
said processing means includes means for deleting from said auxiliary file the second article data read by said processing means from said auxiliary file to vary the ratio between the sizes of said first and second areas.

10. An electronic cash register comprising:
file memory means for storing an article file in which article data items of first articles are filed, each of the code and an article name, and for storing an auxiliary file in which article data including data items of second articles are filed, each of the article data of said second articles including an article code and an article name;
input means for inputting article data including at least an article code and information related to an article; and
processing means for reading out article data of an article corresponding to the article code input via said input means from the article file, and for processing the readout data;
wherein said processing means further includes setting means for reading out article data of a second article filed in the auxiliary file when said article data of the second article is not stored in the article file, and for setting the readout article data in the article file along with data input via said input means; and
said setting means including deleting means for deleting article data from said auxiliary file which was used for setting-up the article file and which was left in the auxiliary file.

11. An electronic cash register comprising:
file memory means for storing an article file in which article data items of first articles are filed, each of the article data items of said first articles including an article code and an article name, and for storing an auxiliary file in which article data including data items of second articles are filed, each of the article data of said second articles including an article code and an article name;
input means for inputting article data including at least an article code and information related to an article; and
processing means for reading out article data of an article corresponding to the article code input via said input means from the article file, and for processing the readout data;
wherein said processing means further includes setting means for reading out article data of a second article filed in the auxiliary file when said article data of the second article is not stored in the article file, and for setting the readout article data in the article file along with data input via said input means; and
said setting means including modifying means for modifying part of the article data of a second article read out from the auxiliary file on the basis of data input via said input means, before setting the read out article data in article file.

12. An electronic cash register comprising:
file memory means for storing an article file in which article data items of first articles are filed, each of the article data items of said first articles including an article code and an article name, and for storing an auxiliary file in which article data including data items of second articles are filed, each of the article data of said second articles including an article code and an article name;

input means for inputting article data including at least an article code and information related to an article; and processing means for reading out article data of an article corresponding to the article code input via said input means from the article file, and for processing the readout data;

wherein said processing means further includes setting means for reading out article data of a second article filed in the auxiliary file when said article data of the second article is not stored in the article file, and for setting the readout article data in the article file along with data input via said input means;

said processing means further including switching means for selectively setting at least a registration mode and a setting mode;

said setting means including detecting means for detecting in at least said setting mode that article data of an article corresponding to the input article code input via said input means is not present in the article file and is present in the auxiliary file, and transfer means for reading out the article data detected by the detecting means from the auxiliary file and setting the readout article data in the article file with data input via said input means; and said processing means further includes settling means for registering the article code input by said input means as a sold article in the registration mode and settling the sold article based on the article data set in the article file by said transfer means.

13. An article cash register according to claim 12, wherein said setting means further includes modifying means for modifying part of the article data read out from the auxiliary file on the basis of data input via said input means, before setting the read out article data in the article file.

* * * * *